UNITED STATES PATENT OFFICE.

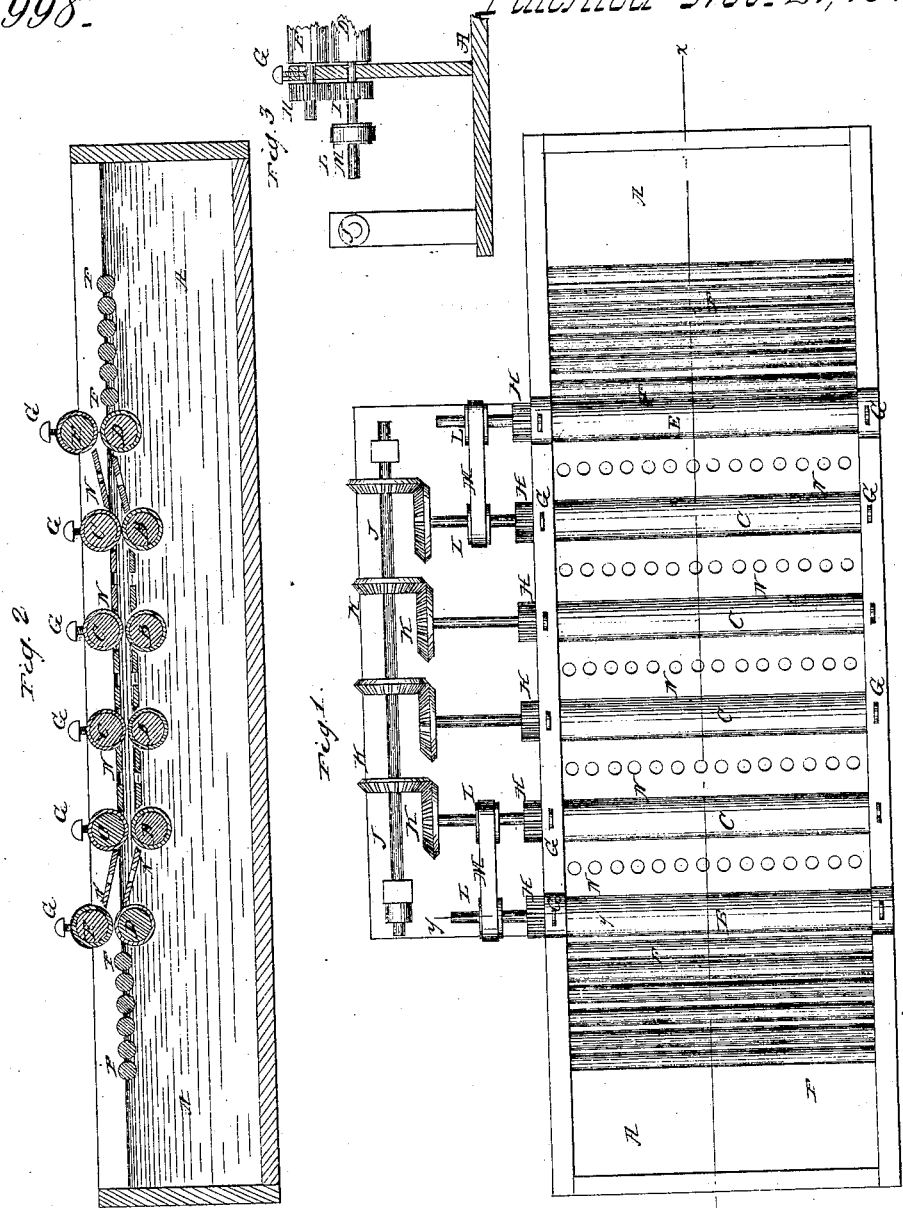

HENRY W. ADAMS, OF IRVINGTON, NEW JERSEY.

IMPROVEMENT IN TANNING.

Specification forming part of Letters Patent No. 50,998, dated November 21, 1865.

*To all whom it may concern:*

Be it known that I, HENRY W. ADAMS, of Irvington, in the county of Essex and State of New Jersey, have invented a new and Improved Tanning Apparatus; and I do hereby declare that the following is a full, clear, and exact description thereof, which will enable others skilled in the art to make and use the same, reference being had to the accompanying drawings, forming forming part of this specification, in which—

Figure 1 is a top or plan view of my improved apparatus. Fig. 2 is a vertical longitudinal section through the line $x$ $x$, Fig. 1. Fig. 3 is a detail view, partly in section, through the line $y$ $y$, Fig. 1.

The tissues of skins consist of albumen and gelatine united in various proportions, and each presenting various degrees of condensation of texture. The action of reagents on gelatine is of high interest. When acted upon by chlorine gelatine is converted into a flocculent substance insoluble in water, but dissolved by an excess of gelatine. Gelatine is not precipitated by alum; but if a solution of common salt be mixed therewith the gelatine falls down, combined with alumina, as it decomposes the muriate of alumina which is then formed. On this principle is founded the manufacture of white leather by a kind of tanning with alum. The most important compound of gelatine is that with tannic acid, which constitutes ordinary leather. This reaction is so distinct that one part of gelatine in five thousand of water is at once detected by the infusion of galls. The constitution of the precipitate varies according as one or other of these materials is employed in excess, the tannic acid and gelatine being capable of uniting in at least three different proportions. One hundred parts of dry gelatine combine with one hundred and thirty-six parts of tannic acid when the latter is in great excess. This compound contains an atom of each ingredient. Hot water dissolves gelatine, consequently skins cannot be tanned in warm or hot solutions of tannic acids or salts without destroying the toughness of the leather. It consists, in such cases, of soluble gelatine precipitated by tannic acid in powder in the interstices of the skin, which is devoid of strength. As skins, therefore, must be tanned at a temperature below blood-heat in order to cause the tannin to combine with the gelatinous tissues prior to their solution by heat, it has hitherto required a very long time to penetrate skins with tanning substance in sufficient quantities to tan thoroughly their interior portions. The outer surfaces in contact with the tanning-liquors appear to tan moderately quick, and then retard the interpenetration of the tanning-bath by closing up their pores, in consequence of the expansion and enlargement of the tanned tissues. The time thus required varies from four months to three years, according to the thickness of the skin and the temperature of the liquor.

Believing that chemical combinations require no time to form when proper conditions are secured, one of which is absolute contact of the combining elements at a suitable temperature, I have labored industriously to ascertain these precedent conditions and supply them, on a practical scale, for the purpose of securing a much greater expedition in tanning leather without sacrificing any of its highest qualities. I perceived in my experiments that skins soaked in any kind of tanning solutions absorb into their pores this solution, the tannin of which combines with the gelatinous tissues and leaves the water from which the tannin has been extracted still filling the pores of the skin, and preventing more of the richer solution in contact with its exterior surfaces from entering with fresh supplies of tannin for the gelatine of the interior tissues. It seemed to me if I could remove this exhausted water from the interior and let in more of the outside liquor, richer in tannin, I should supply one of the necessary conditions of rapid tanning. This appears to be a most rational conclusion, when it is considered that it takes one hundred and thirty-six parts of dry tannic acid to saturate or combine with one hundred parts of dry gelatine. This great amount of tannin cannot rapidly work its way by the vehicle of water from the outside through the closed up exterior pores and tanned surfaces into the interior of the skin, which is at the same time filled with the spent liquor. I took a clothes-wringer and fastened it to a water-pail and filled the pail partially full of a solution of tannic acid, and then soaked a portion of the pate of an ox, from which the hair had been removed by a tanner at my request, and passed it through the rollers. After doing this a few times I was surprised to see how supple the piece had become and how rapidly it was tanning. After working it more or less by saturating and wringing for about fourteen hours I wrung it and washed and wrung it in clean water until I had washed out all uncombined tannin. I dried it and took it to practical tanners and shoemakers, who, on examination, universally declared it to be perfectly tanned, and to be the first quality of leather. I then had a shoemaker work it into soles and put them on a pair of shoes. He said he never worked finer, tougher, or more perfect leather. I continued these experiments until the demonstration became clear that a calf's skin can be tanned in one hour, and an ox's hide in twenty-four hours, by this process. My experiments were made in my cellar with liquor at the common temperature, which could not have been higher than 60° Fahrenheit. On a careful observation and consideration I am satisfied that the rollers, between which the skins are passed and squeezed or wrung, perform three very important offices. They stretch out or pull the skins and prepare them for the quick penetration of the tanning liquor; they squeeze out the spent water from their pores and thus prepare them for the impenetration and reception of fresh supplies of tannin, and they cause the liquor to flow horizontally before them through the interior of the skin and in perpetual moving contact with all the inner gelatinous tissues. The result of this operation, repeated often for a sufficient number of times, keeps up such a constant and abundant supply of fresh liquor in perpetual motion and absolute contact with the interior as well as exterior tissues, and initiates and replaces the pulling, working, and stretching process of the hands, that the leather is not only tanned very rapidly, but is rendered remarkably supple and tough.

To make this process more practical and expeditious on a large scale, I employ several sets of wringers at a proper distance from each other, working under the surface of the tanning-liquor, so that the wringing, pulling, and resaturating process may be going on at the same time, placing the end wringers above the tanning-liquor so as to wring each skin as it comes through, and throw it on the platform of rollers, to be removed or to be dropped into the liquor again at the end of the vat. I do not confine myself to this precise use of the wringers. They may all work above the surface of the tanning-liquor or all below, and the same general results may be accomplished. One skin may be put in and worked forward and backward between the rollers before it is discharged; or many skins may be passed successively through them and be landed in the opposite end of the vat, when the motion of the wringers may be reversed, and they may be returned through the rollers to the other end. Practice will determine what motions are best. The wringers are adjusted by screws or springs, similar to other wringers, for the purpose of allowing the skins, as they swell up and grow thicker by the absorption and combination with tannin, to pass between them. White leather may be tanned by this process by the use of alum and salt, or other salts or tanning or curing substances.

The highest strength of tanning-liquors employed by tanners generally is about 12° of the barkometer. They commence with much weaker solutions. I can use much stronger liquors, because my process forces them equally well through the skins. I have used liquors marking 200°, and even more, on the barkometer. The only condition necessary is to re-enforce the strength of the tanning-bath by fresh tannin, so as not to allow the bath to fall below its original strength. This is best done by dissolving dry tannin or salts from time to time in the vat, as the liquor grows weaker by the process of tanning.

A is the vat which contains the tanning-liquor, and within which are placed the rollers B C D E F, which rollers extend across the vat and revolve in bearings in its sides. One end of the axles of the rollers B C D E revolve in bearings placed in recesses cut into the inner side of said vat and do not extend through, thus dispensing with the use of stuffing-boxes and packing at that end of the axles. The other ends of the axles of the said rollers pass through the side of the vat, for convenience in attaching the necessary gearing for imparting motion. At this end of the rollers the axles must pass through and revolve in stuffing-boxes the rubber or other packing of which will prevent the passage and resist the action of the tanning-liquors. The bearings of the upper row or series of rollers C E must also be made adjustable, so that the rollers can accommodate themselves to the different thicknesses of the skins that may be passed between them and the lower series, either by screws G or springs or their equivalent. The rollers are also covered with rubber or other flexible and elastic substance, which, by yielding, may more readily allow the skins to pass between the upper and lower series, while at the same time exerting sufficient pressure to squeeze the spent liquor therefrom.

To the projecting ends of the upper series of rollers, E C, are attached gear-wheels H, which mesh into gear-wheels I, attached to the projecting axles of the lower series of rollers, D B. Motion is communicated from the shaft J by means of the bevel-gears K to the rollers B, which, in turn, by means of the gear-wheels I H, transmit the motion to the rollers C. The two outer rollers, B, by means of the pulleys L and bands M, transmit the motion to the rollers D, and they by means of the gear-wheels I H impart motion to the rollers E. Thus by the revolution of the shaft J uniform motion is given to all the rollers. The pairs of rollers B C are so placed that the skins, while passing between them, shall be constantly beneath the surface of the tanning-liquor; but the end pairs, D E, are more elevated, so that the skins, while passing between them, shall be above the surface of the tanning-liquor, being delivered upon the platform of rollers F, with the liquor wrung or squeezed out.

N are perforated boards or platforms extending between each pair of rollers in the manner represented in Fig. 2, and intended to serve as guides and supports to the skins in their passage from one pair of rollers to another, during which passage they become saturated with the tanning-liquor, to have it again wrung or squeezed out by the next pair of rollers. The boards or platforms N are perforated, to allow a free circulation of the tanning-liquor from and to the skins during their passage, and their ends are firmly secured to the sides of the vat. A quantity of skins having been placed in the vat they are removed therefrom singly by the tanners to the platform F at one end of the system of rollers, and immediately placed in a position to pass evenly between the end pair of rollers; thence they will pass automatically through the entire series of pairs and be delivered upon the platform at the other end of the vat, to be again returned to the vat, or returned through the rollers, the direction of whose motion may be changed for this purpose by any of the ordinary means for changing the direction of motion. The platform F is made of rollers for convenience in handling and feeding the hides and in delivering them automatically from the system of rollers through which they have passed.

Zinc or other metal galvanized with zinc should be used whenever metal is required for journals, bearings, stuffing-boxes, linings, &c., in contact with the tanning-liquor, for the reason that tannic acid does not precipitate the salts of zinc.

Having thus described my invention, I claim as new and desire to secure by Letters Patent—

1. The use of one or more pairs of rollers or wringers, B C, for forcing tanning-liquor into skins or leather, driving it before them horizontally, or otherwise, through the pores of the same in contact with the gelatinous tissues, squeezing out the partially-spent saturating-liquor, stretching, pulling, working, and wringing them, substantially in the manner and for the purposes hereinbefore set forth.

2. The mechanical construction and use of the tan-vat, in combination with the wringing and stretching rollers B C D E, or either of them, substantially in the manner and for the objects stated.

3. The feed rollers or tables F, in combination with the wringing and stretching rollers B C D E, or either of them, substantially in the manner and for the objects named.

4. The wringing rollers D E, which work above the tanning-liquor, in combination with the wringers and stretchers B C, which work below it, substantially in the manner and for the purposes specified.

5. The use of zinc, or other metal galvanized with zinc, for linings, journals, bearings, stuffing-boxes, and other useful purposes, in contact with tannic acid, when employed in the vat for tanning leather, substantially as described, and for the purposes set forth.

6. The guides N, by and between which the skins pass from one pair of rollers to the next-following pair, in combination with the said rollers or wringers, substantially as described, and for the purposes set forth.

7. The use of stuffing-boxes in combination with the ends of the rollers which pass through the side of the tan-vat, for the purpose of preventing leakage of the tanning-liquor, substantially as described.

8. The screws G, or their equivalent, in combination with one roller of each pair when the said rollers are employed for tanning leather, substantially as set forth, for the purpose of adjusting the space between the rollers of each pair to accommodate different thicknesses of skins and the increasing thickness of the same skin as the process of tanning advances.

9. The use of india-rubber or equivalent flexible and yielding substance around the rollers or wringers, when the said wringers or rollers are employed for tanning or wringing skins or leather, but not otherwise, for the purpose of accommodating the space between the said rollers of each pair to the different thicknesses of the same skin, substantially as described.

10. The entire mechanical process of expeditiously tanning leather substantially in the manner herein set forth.

HENRY W. ADAMS.

Witnesses:
M. M. LIVINGSTON,
C. L. TOPLIFF.